United States Patent [19]

Fudono et al.

[11] Patent Number: 5,067,556
[45] Date of Patent: Nov. 26, 1991

[54] CONTROLLER OF REFRIGERATING PLANT

[75] Inventors: Kanji Fudono; Toshimasa Takahashi, both of Nagoya; Hiroshi Ogawa; Toshio Yamashita, both of Aichi, all of Japan

[73] Assignee: Mitsubishi Jukogyo Kabushiki Kaisha, Tokyo, Japan

[21] Appl. No.: 596,030

[22] Filed: Oct. 11, 1990

[30] Foreign Application Priority Data

Oct. 13, 1989 [JP] Japan .............................. 1-120256[U]

[51] Int. Cl.$^5$ ............................................ F25B 29/00
[52] U.S. Cl. ..................................... 165/29; 62/196.4
[58] Field of Search ...................... 62/196.4, 212, 225; 165/29

[56] References Cited

U.S. PATENT DOCUMENTS 4,509,586  4/1985  Watabe .................................. 165/29
4,542,783  9/1985  Fujimoto et al. ............... 62/196.4 X
4,617,804  10/1986  Fukushima et al. ................... 62/212

FOREIGN PATENT DOCUMENTS 1-70061  5/1989  Japan .

Primary Examiner—William E. Wayner
Attorney, Agent, or Firm—Fleit, Jacobson, Cohn, Price, Holman & Stern

[57] ABSTRACT

Control means in a controller for a refrigerating plant for turning on an electric heater (7) adjacent the evaporator (3) when the degree of superheat (27) of the refrigerant in the line between the evaporator (3) and compressor (1) exceeds its upper limit set value (31, 32, 33, 34), and turns off the electric heater (7) when the degree of superheat falls below its lower limit set value (31, 32, 33, 34).

2 Claims, 2 Drawing Sheets

CONTROLLER OF REFRIGERATING PLANT

BACKGROUND OF THE INVENTION

The present invention relates to a controller of a refrigerating plant, and more particularly to a controller adapted for application to a refrigerated transporting unit.

A system diagram for such a refrigerating plant is shown in FIG. 3.

A refrigerant gas at high temperature and high pressure that is discharged from a compressor 1 enters a condenser 2 where the refrigerant gas is condensed to be liquified by releasing its heat into outside air blown by a condenser fan 4. The liquefied refrigerant enters an electronic expansion valve (referred to as EEV hereinafter) 6 where it becomes a mixture of vapor and liquid phases as a result of an adiabatic expansion caused by a reduction of area. Then, the refrigerant in the vapor-liquid phases enters an evaporator 3 where the refrigerant is evaporated to be gasified by room air to be cooled and blown by an evaporator fan 5, and returns to the compressor 1.

The outputs of an intake refrigerant pressure sensor 9 for detecting the pressure of the refrigerant sucked into the compressor 1, an intake refrigerant temperature sensor 10 for detecting the temperature of the refrigerant and a blown air temperature sensor 8 for detecting the temperature of the air blown down from the evaporator 3, are input to a controller 11. By commands from the controller 11, the openings of the EEV 6 and a hot gas control valve (referred to as MV) 13 that is inserted in a hot gas bypass circuit 12 are regulated, and an electric heater 7 for heating air to be blown down from the evaporator 3 is turned on and off.

When the blown air temperature detected by the blown air temperature sensor 8 is lower than a set temperature that is preset in the controller 11, the refrigerating capacity is lowered by augmenting the quantity of the refrigerant gas that is bypassed through the hot gas bypass circuit 12 by increasing the opening of the MV 13 upon receipt of a command from the controller 11 in response to the deviation between the two temperatures.

When the opening of the MV 13 exceeds its set value for the upper limit (referred to as U−MV hereinafter), the control target value of the degree of superheat (value obtained by subtracting the saturation temperature corresponding to the pressure detected by the intake refrigerant pressure sensor 9 from the temperature detected by the intake refrigerant temperature sensor 10, referred to as SSH hereinafter) of the refrigerant gas at the outlet of the evaporator 3 is gradually raised to reduce the circulating quantity of the refrigerant and to further lower the refrigerating capacity by reducing the opening of the EEV 6.

In case the blown air temperature is still lower than its set temperature even after the adjustment of the openings of the MV 13 and the EEV 6, the operation is shifted to that of turning on the electric heater 7 (this operation is referred to as STEP 2 hereinafter). During the operation of STEP 2 and when the opening of the MV 13 is lower than the L−MV, in the event the blown air temperature does not go down even when the control target value of the SSH is set at the value for the highest capacity output, the operation is shifted to that having the electric heater 7 turned off (this operation is referred, to as STEP 1 hereinafter).

On the contrary, when the blown air temperature exceeds its set temperature, the refrigerating capacity is augmented by reducing the opening of the MV 13 in response to the deviation between the two temperatures. When the opening of the MV 13 falls below its lower limit set value (referred to as L−MV hereinafter), the refrigerating capacity is further augmented through an increase in the opening of the EEV 6 by gradually lowering the control target valve of the SSH.

However, in the conventional device, when the opening of the MV 13 exceeds the U−MV, the opening of the EEV 6 goes down so that the circulating quantity of the refrigerant is decreased. Then, the refrigerant is evaporated in the portion on the inlet side of the evaporator 3, with air that passes through the portion on the inlet side alone being cooled, whereas air that passes through other portions is not cooled. This gives rise to an inconvenience that the temperature distribution of the air that is blown down from the evaporator 3 becomes unsatisfactory, which results in an aggravation of the temperature distribution within the refrigerated chamber.

In order to cope with the situation, STEP 2 is executed by turning on the electric heater 7 despite the fact that of the conditions may allow the execution of STEP 1, and thus there is a disadvantage that the power is wastefully consumed.

BRIEF SUMMARY OF THE INVENTION

It is a main object of the present invention to provide a controller of a refrigerating plant which is capable of preventing an aggravation of the temperature distribution of air blown don from an evaporator when the degree of superheat of the refrigerant exceeds an upper limit set value.

It is another object of the present invention to provide a control device of a refrigerating plant which makes it possible to save wasteful consumption of the power when the degree of superheat of the refrigerant drops to below its lower limit set value.

In order to achieve the above-mentioned object, in a controller of a refrigerating plant that is equipped with a compressor, a condenser, an evaporator, a hot gas bypass circuit which leads a high-temperature refrigerant gas discharged from the compressor to the evaporator, an electric heater which heats air blown down from the evaporator, a hot gas control valve inserted in the hot gas bypass circuit, with its opening adjusted in response to the difference between the temperature of an object to be cooled and a set temperature, an electronic expansion valve which controls the degree of superheat of the refrigerant at the outlet of the evaporator and means for changing the control target value for the degree of superheat of the electronic expansion valve in response to the opening of the hot gas control valve, the controller of a refrigerating plant in accordance with the present invention is provided with control means which turns on the electric heater when the degree of superheat of the refrigerant exceeds a set value for its upper limit, and turns off the electric heater when the degree of superheat of the refrigerant falls below a set value for its lower limit.

BRIEF DESCRIPTION OF THE DRAWINGS

The invention will now be described in detail with reference to the accompanying drawings wherein.

DETAILED DESCRIPTION OF THE PREFERRED EMBODIMENT

Figure 1:
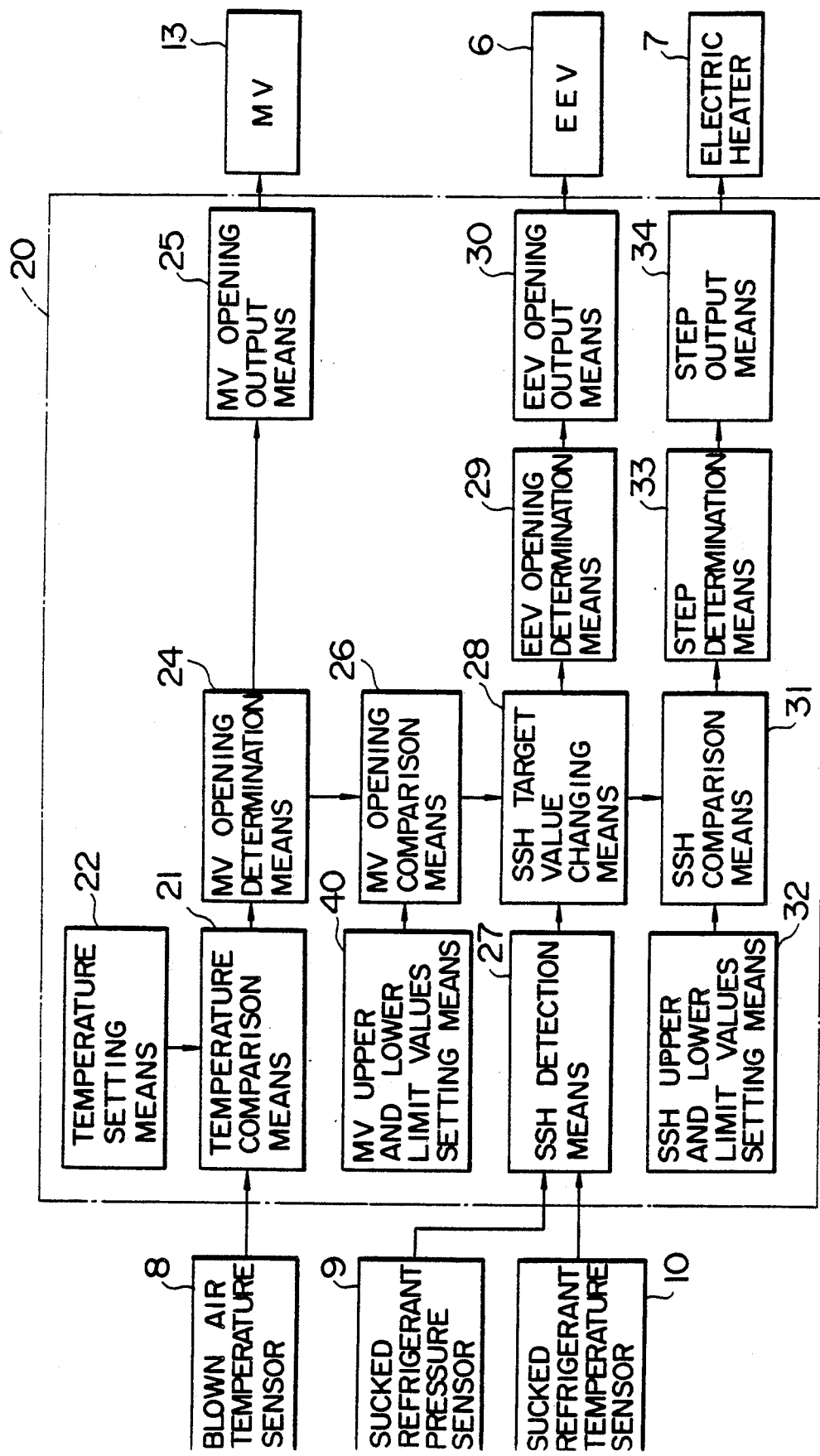
FIG. 1 is a control block diagram for the controller of a refrigerating plant in accordance with an embodiment of the invention.
Figure 2:
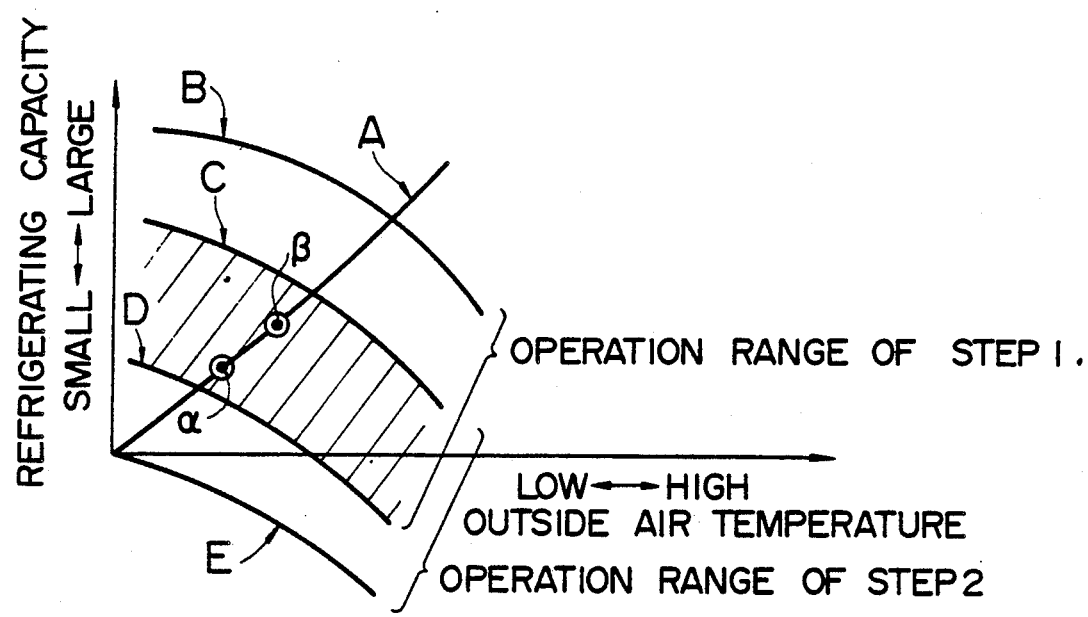
FIG. 2 is a characteristic diagram showing the interrelation between the outside air temperature, refrigeration load and refrigerating capacity.
Figure 3:
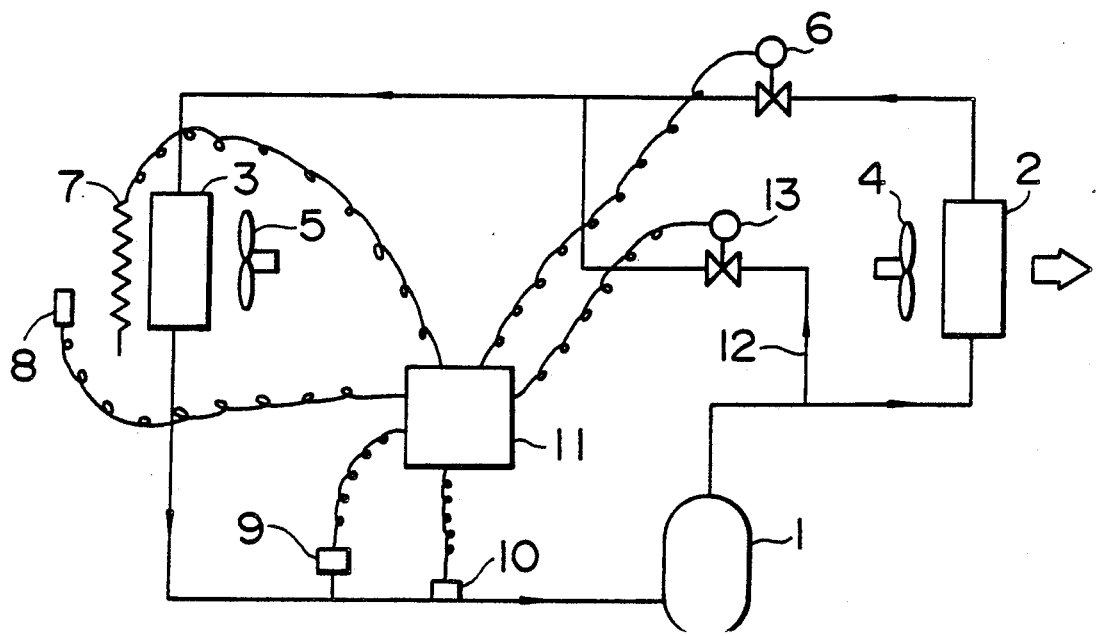
FIG. 3 is a system diagram for the conventional refrigerating plant.

Referring to FIG. 1 and FIG. 2, an embodiment according to the present invention will be described in more detail in the following. In FIG. 1 is shown a functional block diagram for the controller, and in FIG. 2 are shown curves that show interrelation between the outside air temperature, refrigerating capacity and refrigeration load. It should be noted that the refrigerant circuit of the refrigerating plant is the same as the conventional one that is shown in FIG. 3 except that the controller 11 in FIG. 3 is to be replaced by a controller 20 shown in FIG. 1.

As shown in FIG. 1, the blown air temperature detected by the blown air temperature sensor 8 is input to temperature comparison means 21 of a controller 20, where the temperature is compared with a set temperature input from temperature setting means 22. The deviation between the two temperatures is input to MV opening determination means 24 where the opening of a hot gas control valve (MV) 13 is determined. The opening of the MV 13 is adjusted by sending the output of the means 24 to the MV 13 via MV opening output means 25. In this way, the temperature of the object to be cooled, namely, the temperature within the chamber is maintained at a set temperature by adjusting the refrigerating capacity by increasing or decreasing the quantity of the refrigerant gas that is bypassed through the hot gas bypass circuit 12.

On the other hand, the pressure of the sucked refrigerant detected by the intake refrigerant pressure sensor 9 and the temperature of the sucked refrigerant detected by the intake refrigerant temperature sensor 10 are input to SSH detection means 27 of the controller 20. The degree of superheat of the sucked refrigerant, namely, the degree of superheat SSH of the refrigerant at the outlet of the evaporator 3 is calculated in the means 27 by subtracting the saturation temperature corresponding to the pressure of the sucked refrigerant from the temperature of the sucked refrigerant. The value of the SSH thus calculated is input to SSH target value changing means 28.

The MV opening determined in the MV opening determination means 24 is input to MV opening comparison means 26 where the input MV opening is compared with an MV upper limit valve (U−MV) and an MV lower limit value (L−MV) that are input from MV upper and lower limit values setting means 40. When the MV opening determined by the MV opening determination means 24 is above the U−MV or below the L−MV, the MV opening comparison means 26 outputs a predetermined control signal to the SSH target value changing means 28.

The SSH target value changing means 28 determines to raise the control target value for the degree of superheat of the electronic expansion valve (EEV), that is, the SSH target value, and determines to lower the SSH target value when the MV opening is below the L−MV.

The SSH target value that is changed is input to EEV opening determination means 29 where the opening of the EEV 6 is determined corresponding to the SSH target value. The opening of the EEV 6 is adjusted by outputting the determined EEV opening to the EEV 6 via EEV opening output means 30. Namely, when the MV opening exceeds the U−MV, the refrigerating capacity is lowered by decreasing the opening of the EEV 6 by raising the SSH target valve. On the contrary, when the MV opening falls below the L−MV, the refrigerating capacity is augmented by increasing the opening of the EEV 6 by lowering the SSH target valve.

When the output from the MV opening comparison means 26 is not input to the SSH target value changing means 28, the SSH detected by SSH detection means 27 is input as is to the EEV opening determination means 29 where the opening of the EEV 6 is determined in response to the SSH value detected. In this manner, the opening of the EEV 6 is adjusted so as to maintain the degree of superheat of the refrigerant at the outlet of the evaporator at a constant level.

So far, the operation is the same as in the conventional device.

In the present embodiment, however, the output of the SSH target value changing means 28 is also input to SSH comparison means 31, where its output is compared with an upper limit set value (U−SSH) and a lower limit set value (L−SSH) that are input from SSH upper and lower limits setting means 32. Here, the upper limit set value (U−SSH) is set at a value which is slightly lower than the upper limit value for protecting the compressor 1, and the lower limit set value (L−SSH) is set at a value which is slightly higher than the lower limit value for protecting the compressor 1.

The result of comparison in the SSH comparison means 31 is input to STEP determination means 33 where STEP 2 is determined when the SSH target value exceeds the upper limit set value (U−SSH), and STEP 1 is determined when the SSH target value falls below the lower limit set value (L−SSH). The output of the step determination means 33 is sent to the electric heater 7 via step output means 34 to turn on or off the electric heater 7.

Referring to FIG. 2, line (A) is a refrigeration load curve, line (B) is a refrigerating capacity curve for the case where the opening of the MV 13 is at the L−MV and the electric heater 7 is turned off, line (C) is a refrigerating capacity curve for the case where the opening of the MV 13 is at the L−MV and the electric heater 7 is turned on, line (D) is a refrigerating capacity curve for the case where the opening of the MV 13 is at the U−MV and the electric heater 7 is turned off and line (E) is a refrigerating capacity curve for the case where the opening of the MV is at the U−MV and the electric heater 7 is turned on.

When the refrigeration load is between the refrigerating capacity curves (C) and (D), namely, when it is within the hatched range in FIG. 2, both operations of STEP 1 and STEP 2 are available.

Now during the operation of STEP 1, when the refrigeration load is reduced and approaches a point α in the vicinity of the lower limit of the capacity control range of STEP 1, the opening of the MV 13 is larger than its upper limit set valve (U−MV), and is smaller than the opening of the EEV 6. When the SSH target value exceeds its upper limit value (U−SSH) due to further reduction of the refrigeration load, the operation is shifted to STEP 2. Then, due to a drop in the refrigerating capacity caused by the heating of the blown air by the electric heater 7, the opening of the MV 13 is decreased with an accompanying drop in the SSH target valve, whereby the opening of the EEV 6 is increased and the temperature distribution of the air blown off from the evaporator 3 is improved.

During the operation of STEP 2, when the refrigeration load is increased and it approaches a point $\beta$ in the vicinity of the upper limit of the capacity control range of STEP 2, the opening of the MV 13 is small and the opening of the EEV is increased due to a drop in the SSH target value, with the refrigerating capacity approaching its maximum value. Here, if the SSH target value falls below the L−SSH, the operation is shifted to STEP 1. Then, the electrical heater 7 is turned off with a corresponding rise in the refrigerating capacity, which leads to an increase in the opening of the MV 13 and an enhancement of the target value, with a resulting decrease in the opening of the EEV 6.

In accordance with the present invention which is constructed as in the above, the electric heater is turned on when the degree of superheat of the refrigerant exceeds its upper limit set value, and the electric heater is turned off when the degree of superheat of the refrigerant falls below its lower limit set value.

As a result, it becomes possible to avoid wasteful power consumption at the time when the degree of superheat of the refrigerant falls below the lower limit set value, and to prevent the aggravation of the temperature distribution of the blown air at the time when the degree of superheat for the refrigerant exceeds its upper limit set value.

We claim:

1. In a controller of a refrigerating plant equipped with each of (a) a compressor;
    (b) a condenser;
    (c) an evaporator having an opening;
    (d) a hot gas bypass circuit for leading a high temperature refrigerant gas discharged from said compressor to said evaporator;
    (e) an electric heater for heating air emitted from said evaporator;
    (f) a hot gas control valve inserted in said hot gas bypass circuit and having an opening adjustable in response to the difference between the temperature of an object to be cooled and a preset temperature;
    (g) an electronic expansion valve for controlling the degree of superheat of the refrigerant at the outlet of said evaporator; and
    (h) means for changing the control target value for the degree of superheat of said electronic expansion valve in response to the opening of said hot gas control valve, the improvement comprising:
    control means for turning on said electric heater when said degree of superheat of the refrigerant exceeds its upper limit preset value, and for turning off said electric heater when said degree of superheat of the refrigerant falls below a lower limit preset value.

2. A controller of a refrigerating plant as claimed in claim 1, wherein said control means comprises:
    said changing means;
    limit value setting means for setting the upper limit value and the lower limit value of the degree of superheat;
    comparison means for comparing the outputs of said changing means and setting means; and
    means for turning said electric heat on and off based on the comparison output from said comparison means.

* * * * *